United States Patent [19]
Piccariello

[11] Patent Number: 5,732,995
[45] Date of Patent: Mar. 31, 1998

[54] TAILGATE EXTENDER

[76] Inventor: Louis A. Piccariello, 39455 Vassar Ct., Sterling Heights, Mich. 48313

[21] Appl. No.: 504,647

[22] Filed: Jul. 20, 1995

[51] Int. Cl.$^6$ ............................................. B62D 33/08
[52] U.S. Cl. ............................................. 296/57.1
[58] Field of Search ................. 296/26, 50, 57.1, 296/61; 414/537

[56] References Cited

U.S. PATENT DOCUMENTS

| | | |
|---|---|---|
| 3,977,545 | 8/1976 | Lloyd . |
| 4,531,773 | 7/1985 | Smith ................................ 296/57.1 |
| 4,601,632 | 7/1986 | Agee . |
| 4,685,857 | 8/1987 | Goeser et al. . |
| 4,856,840 | 8/1989 | Hanley . |
| 4,900,217 | 2/1990 | Nelson . |
| 4,951,991 | 8/1990 | Haigler . |
| 4,990,049 | 2/1991 | Hargrove . |
| 5,000,503 | 3/1991 | Bernatek ............................ 296/57.1 |
| 5,098,146 | 3/1992 | Albrecht et al. .................... 296/26 |
| 5,188,418 | 2/1993 | Walworth, Jr. et al. . |
| 5,312,149 | 5/1994 | Boone ................................ 414/537 |

*Primary Examiner*—Joseph D. Pape
*Attorney, Agent, or Firm*—Peter D. Keefe

[57] ABSTRACT

A tailgate extender providing selective height adjustment of the tailgate so that conditions associated with particular loads of a pick-up truck bed may be properly and safely accommodated, composed generally of: a tailgate extension member having a planar configuration for being located adjacent the bed facing side of a tailgate wherein a lip is integrally formed therewith for being located adjacent the top of the tailgate; a plurality of guidance members connected with the bed facing side of the tailgate and slidably engaged with respect to the tailgate extension member; and a stop member for regulating slidable movement of the tailgate extension member relative to the tailgate. Left and right guidance members are at a minimum provided and located, respectively, at the left and right ends of the tailgate extension member. The left and right guidance members serve as guidance for sliding movement of the tailgate extension member relative thereto and the tailgate. Preferably, a center guidance member is also provided located between the left and right guidance members.

13 Claims, 3 Drawing Sheets

TAILGATE EXTENDER

BACKGROUND OF THE INVENTION

1. Field of the Invention

The present invention relates to pick-up truck tailgates, and more particularly to a tailgate extender therefor wherein the height of the tailgate may be selectively varied to accommodate load conditions of the pick-up truck bed.

2. Description of the Prior Art

Pick-up trucks are equipped with a bed rearwardly of the cab, the bed being defined by a front wall at the front end of the bed adjacent the cab, left and right sidewalls extending rearwardly from the front wall and a pivotal tailgate at the rear end of the bed. Tailgates are generally hinged to each of the left and right sidewalls at the bottom thereof adjacent the bed. The tailgate has a height, as measured between the bottom and a top, which is commensurate with the height of the front wall and the left and right sidewalls. A latch mechanism provides selective attitude control over the tailgate between a down position when the tailgate is generally parallel with the bed and an up position when the tailgate is generally perpendicular with the bed.

Operators of pick-up trucks place diverse load materials into the bed thereof. Sometimes, with the tailgate in the up position, the load constitutes loose materials which can bounce around in the bed as the operator drives, potentially becoming dislodged from the bed and posing an unacceptable risk to other motor vehicles following behind the operator's pick-up truck. At other times, with the tailgate in the down position, the load constitutes elongated materials which extend beyond the rear end of the bed, even beyond the top of the tailgate, potentially posing a problem of a portion of the elongated materials being unsupported.

Accordingly, what is needed is some way to provide selective height adjustment of the tailgate so that the conditions associated with particular loads may be properly and safely accommodated.

SUMMARY OF THE INVENTION

The present invention is a tailgate extender which provides selective height adjustment of the tailgate so that the conditions associated with particular loads may be properly and safely accommodated.

The tailgate extender according to the present invention is composed generally of: a tailgate extension member having a planar configuration for being located adjacent the bed facing side of a tailgate wherein a lip is integrally formed therewith for being located adjacent the top of the tailgate; a plurality of guidance members connected with the bed facing side of the tailgate and slidably engaged with respect to the tailgate extension member; and a stop member for regulating slidable movement of the tailgate extension member relative to the tailgate (as well as the guide members which are connected thereto).

It is preferred for the tailgate extension member to be composed of aluminum, but other sturdy and rigid structural materials, such as a high impact resistant plastic may be used. Left and right guidance members are at a minimum provided and located, respectively, at the left and right ends of the tailgate extension member. The left and right guidance members serve as guidance for siding movement of the tailgate extension member relative to the tailgate. Preferably, a center guidance member is also provided located between the left and right guidance members. The stop member is partly connected with the tailgate and partly connected with the tailgate extension member and serves to prevent the tailgate extension member from accidentally dislodging from the guidance members as it is slid therealong. Preferably, a low friction material is present at the interface between the tailgate extension member and the guidance members, such as for example the guidance members being a nylon material.

In operation, if the operator of a pick-up truck equipped with the tailgate extender according to the present invention has a load which is not well adapted to the conventional configuration of a tailgate, the operator pulls on the lip of the tailgate extension member to cause it to slide along the guidance members in relation to the tailgate. The increased height now afforded the tailgate being suitable to now properly accommodate the load, whether it be a situation in which the tailgate is in the down or the up position.

Accordingly, it is an object of the present invention to provide a tailgate extender, wherein the height of a pick-up truck tailgate can be selectively adjusted.

It is an additional object of the present invention to provide a tailgate extender, wherein the height of a pick-up truck tailgate can be selectively adjusted, and wherein the tailgate extender is attractive and structurally consonant with the configuration of a conventional tailgate.

It an additional object of the present invention to provide a tailgate extender, wherein the height of a pick-up truck tailgate can be selectively adjusted, and wherein the tailgate extender is operable whether the tailgate is in the up or the down position.

These, and additional objects, advantages, features and benefits of the present invention will become apparent from the following specification.

DETAILED DESCRIPTION OF THE PREFERRED EMBODIMENT

Figure 1:
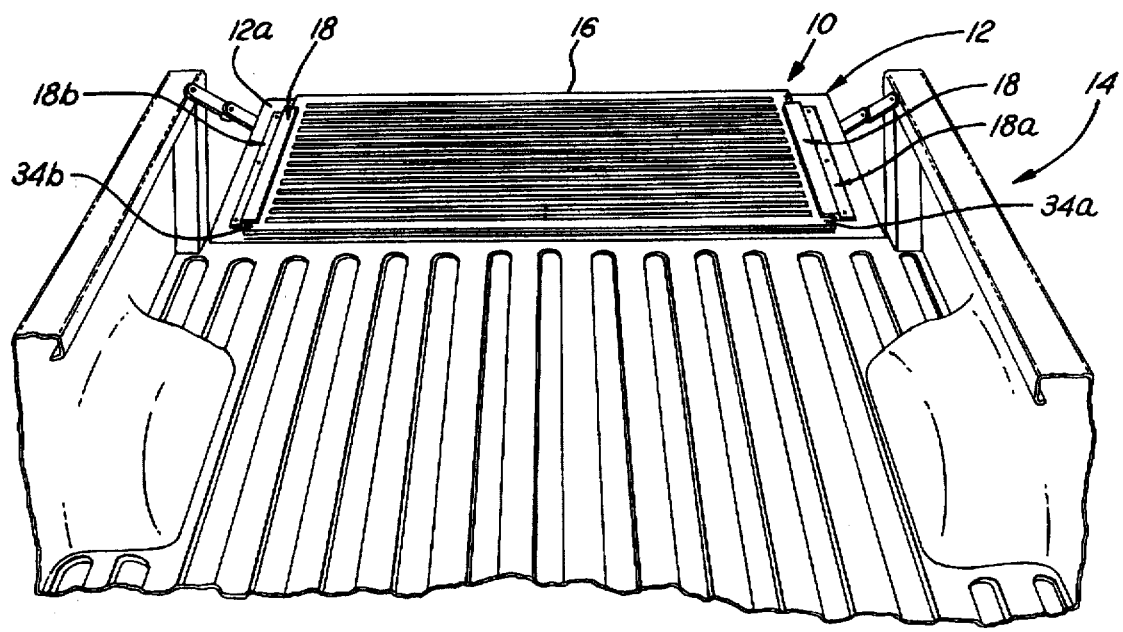
FIG. 1 is a perspective view of a bed of a pick-up truck wherein the tailgate thereof is equipped with the tailgate extender according to the present invention, the tailgate extension member being in a retracted position and the tailgate being in a down position.
Figure 2:
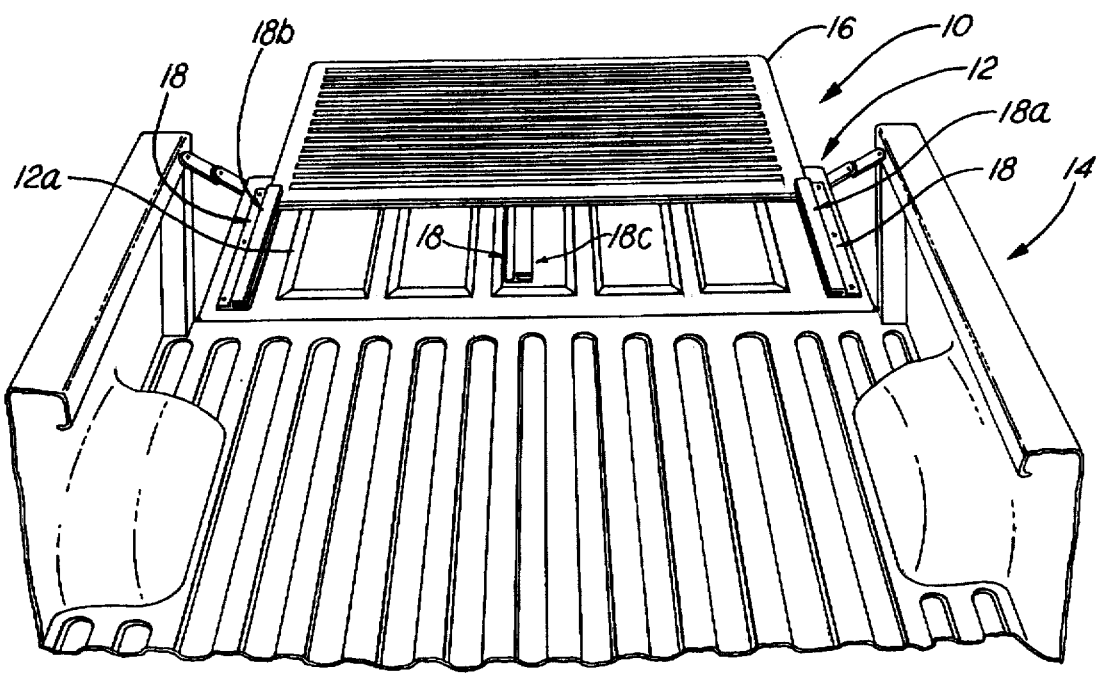
FIG. 2 is a perspective view of a bed of a pick-up truck wherein the tailgate thereof is equipped with the tailgate extender according to the present invention, the tailgate extension member being in an extended position and the tailgate being in the down position.
Figure 3:
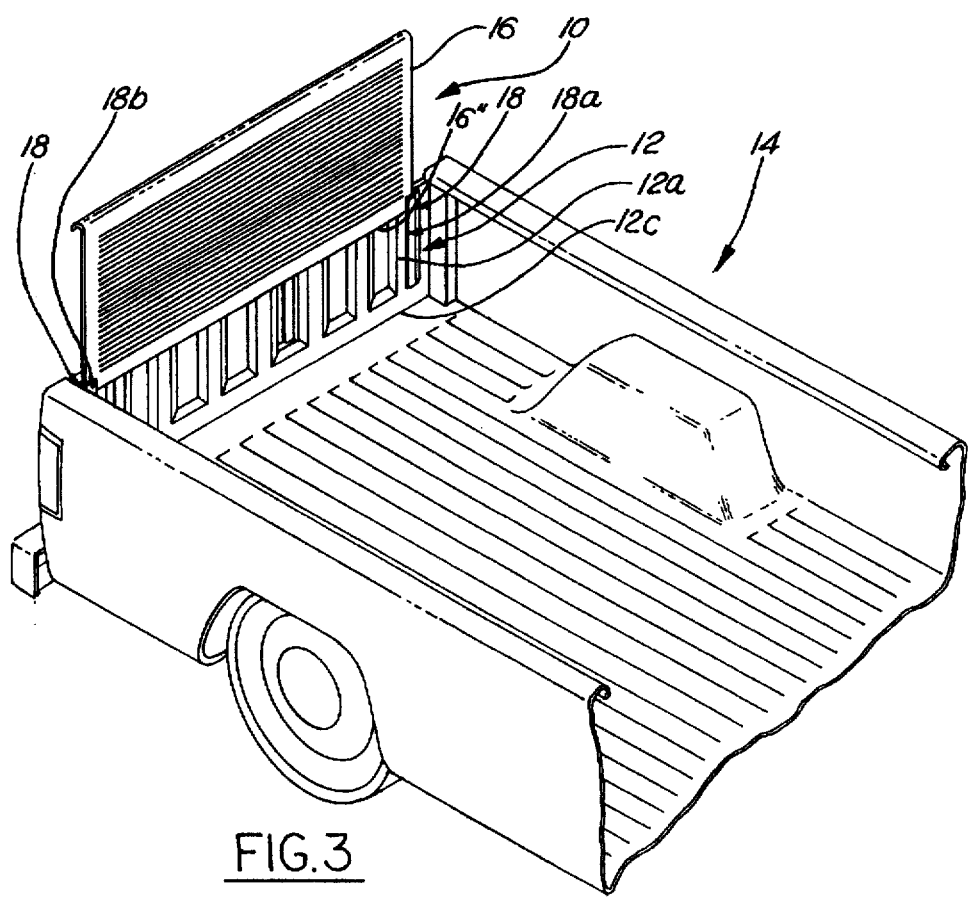
FIG. 3 is a perspective view of a bed of a pick-up truck wherein the tailgate thereof is equipped with the tailgate extender according to the present invention, the tailgate extension member being in the extended position and the tailgate being in an up position.

Referring now to the Drawing, FIGS. 1, 2 and 3 depict the tailgate extender 10 according to the present invention installed on the tailgate 12 of a pick-up truck 14. The tailgate extender 10 includes a tailgate extension member 16 which is slidably interconnected with respect to the bed facing side 12a (that is, bed facing when the tailgate is in the up position) of the tailgate 12. The slidable mounting of the tailgate extension member 16 is provided by slidable interconnection of the tailgate extension member to a plurality of guidance members 18, a minimum thereof being right and left guidance members 18a, 18b. The tailgate extender 10 provides selective adjustment of the height of the tailgate 12 by sliding moment of the tailgate extension member 16 with respect to the tailgate between a retracted position, as shown in FIG. 1, and an extended position, as shown in FIGS. 2 and 3. The structural and functional details of the tailgate extender 10 will now be described with greater specificity.

Figure 6:
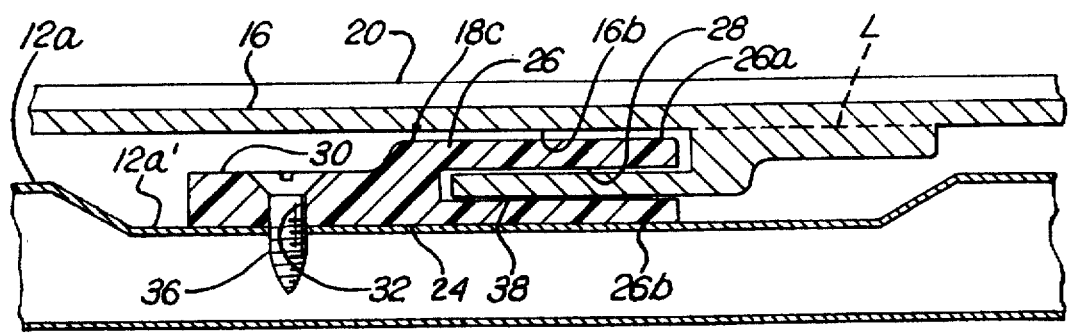
FIG. 6 is a partly broken-away, partly sectional view along line 6–6 in FIG. 4 of the tailgate extender according to the present invention, shown installed on a tailgate of a pick-up truck, and showing in particular a central guidance member according to the present invention.
Figure 7:
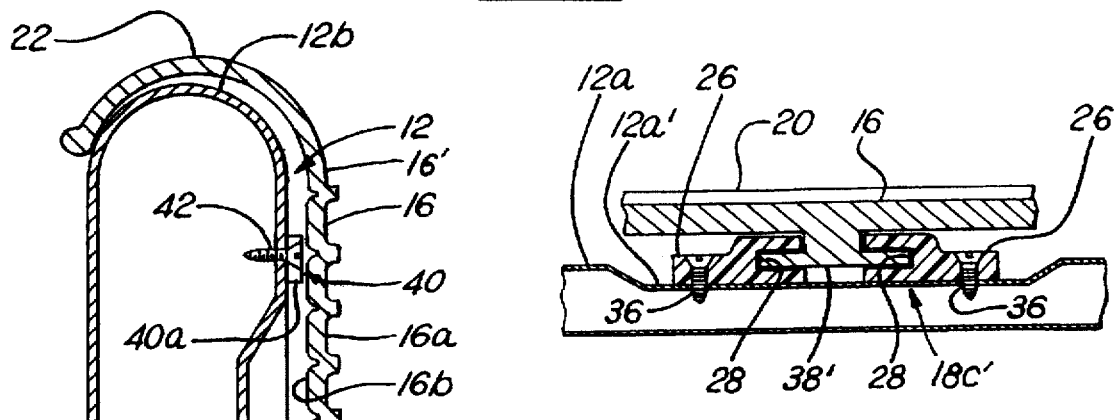
FIG. 7 is a partly broken-away, partly sectional view similar to that of FIG. 6, but now showing an alternative central guidance member according to the present invention.
Figure 8:
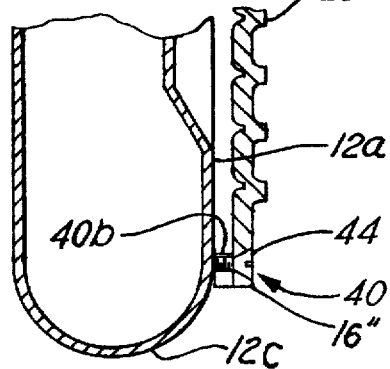
FIG. 8 is a partly broken-away, partly sectional view along line 8—8 in FIG. 4 of the tailgate extender according to the present invention, shown installed on a tailgate of a pick-up truck, wherein the tailgate extension member is depicted in the retracted position.

As can be discerned by additional reference to FIGS. 4 through 8, the tailgate extension member 16 is generally planar and structured to abut and generally cover the bed facing side 12a of a tailgate 12. A preferred composition therefor is anodized, extruded aluminum having a preselected colored finish which matches the finish of the tailgate; a preferred thickness thereof is about 3 mm., wherein the thickness and the chosen material is such as to provide rigidity of the tailgate extension member for support and/or retention of articles carried in the bed of the pick-up truck. Other sturdy and rigid materials may be used for the tailgate extension member 16, such as a high impact resistant plastic material. It is preferred to include transverse ribs 20 ("transverse" meaning parallel with the tailgate extension member bottom 16") on the exterior side 16a of the tailgate extension member 16. It is further preferred to integrally include with the tailgate extension member 16, as shown in FIG. 8, a lip 22 at the tailgate extension member top 16', wherein the lip generally conforms more-or-less to the shape of the tailgate top 12b. Accordingly, as shown in FIG. 8, when the tailgate extension member 16 is in the retracted position, the lip 22 nests with the tailgate top 12b to thereby provide a neat look to the tailgate top, and which further serves to minimize the chances for dirt and weather to enter between the tailgate and the tailgate extension member.

The tailgate extension member 16 is situated adjacent the bed facing side 12a of the tailgate 12, and is connected slidably thereto by the aforementioned guidance members 18. In this regard the right and left guidance members 18a, 18b are located, respectively, at the right and left tailgate extension member ends 34a, 34b. The preferred structure of the right and left guidance members 18a, 18b includes an elongated guide 26 having a tailgate abutment surface 24, upper and lower flanges 26a, 26b therebetween defining an elongated slot 28 which preferably extends the entire length thereof, and a mounting tab 30 having a plurality of holes 32 spaced longitudinally therealong. An example of acceptable dimensions are: the elongated slot having a width of about 3 mm. wherein the respective right or left tailgate extension member end 34a, 34b (which are each about 3 mm. thick) insert therein and are slidable therealong without undue friction therebetween, and each of the upper and lower flanges 26a, 26b being also about 3 mm. thick. A self-tapping screw 36 passes, respectively, through each of the holes 32 and threadably engages an aligned hole in the tailgate 12 to thereby secure the elongated guides 26 of the right and left guidance members 18a, 18b to the tailgate 12. In this regard, it is preferred for the right and left guidance members 18a, 18b to be located, respectively, substantially adjacent the right and left ends of the tailgate 12 so that the tailgate extension member 16 will cover nearly all the bed facing side 12a of the tailgate when in the retracted position (wherein the lip 22 rests upon the tailgate top 12b, the tailgate extension member top 16' is located near to the tailgate top 12b, and the tailgate extension member bottom 16" is located near to the tailgate bottom, as shown generally in FIG. 8).

Figure 5:
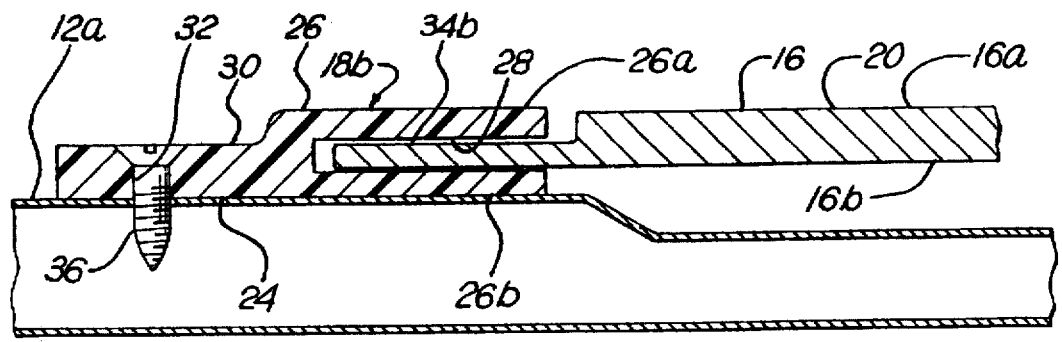
FIG. 5 is a partly broken-away, partly sectional view along line 5–5 in FIG. 4 of the tailgate extender according to the present invention, shown installed on a tailgate of a pick-up truck, and showing in particular a left guidance member according to the present invention.

As shown in FIG. 5, the left tailgate extension member end 34b is slidably received into the elongated slot 28 of the left guidance member 18b. Similarly, the right tailgate extension member end 34a is slidably received in the elongated slot 28 of the right guidance member 18a (see for example FIG. 1). Consequently, the tailgate extension member 16 is slidably connected with the tailgate 12 due to the sliding interconnection of the right and left tailgate extension member ends 34a, 34b with respect to the elongated slots 28 of the right and left guidance members 18a, 18b; that is, the the tailgate extension member slides along, and parallel with, the elongated slot in each of the right and left guidance members. Further, it will be noted that the elongated slots 28 are oriented parallel with respect to the left and right ends of the tailgate 12. Accordingly, sliding movement of the tailgate extension member is parallel to the left and right ends of the tailgate 12.

In order to ensure that the tailgate extension member 16 remains located proximate the bed facing side 12a of the tailgate 12, it is preferred to include at least one guidance member 18 located between the aforementioned right and left guidance members 18a, 18b. In this regard, it is preferred to have a center guidance member 18c located more-or-less centrally between the right and left guidance members 18a, 18b. Preferably, the central guidance member 18c is situated in a depression 12a' of the bed facing side 12a of the tailgate 12, wherein it is noted that depressions 12a' are conventionally provided in modern pick-up truck tailgates.

The preferred structure of the central guidance member 18c is shown in FIG. 6 as being generally the same as the right and left guidance members 18a, 18b, wherein provided is a universally applicable elongated guide 26 for each of the right, left and central guidance members 18a, 18b, 18c. As recounted, a self-tapping screw 36 passes, respectively, through each of the holes 32 and threadably engages an aligned hole in the tailgate 12 to thereby secure the elongated guides 26 to the tailgate. The tailgate extension member 16 is provided with an elongated boss 38 separated from the interior side 16b thereof to allow for the elongated boss to be received into the elongated slot 28 of the elongated guide 26 of the central guidance member 18c. The dimensions are for example as specified hereinabove for the right and left guidance members 18a, 18b, and the elongated boss 38 has an exemplary thickness of about 3 mm. It should be noted that the central guidance member 18c is oriented parallel with respect to the right and left guidance members 18a, 18b. It should be further noted that the elongated boss 38, rather than being integrally formed with the tailgate extension member as shown, could be separately connected thereto (as shown by phantom lines L in FIG. 6) via an adhesive or other known fastening means.

FIG. 7 shows an alternative central guidance member 18' wherein two co-acting elongated guides 26 are connected with the bed facing side 12a of the tailgate 12 at a depression 12a' thereof, wherein the elongated slot 28 of each faces one another. An alternative elongated boss 38' of the tailgate extension member 16 is now provided having a "T" shape which is received simultaneously into each of the slots 28.

Preferably, all sliding interaction between the tailgate extension member 16 and the tailgate 12 occurs only at the elongated slots 28. Accordingly, the predetermined surface of the interior of the elongated slots 28 facilitates sliding movement of the tailgate extension member. In this regard, a preselected material of composition of the elongated guides 26, such as nylon (DuPont Nylon 612 being preferred), and/or the elongated slot surfaces may be coated, such as with TEFLON (a registered trademark) or a lubricant.

Though not preferred because of structural complexity and cost, it is possible to provide the sliding interconnection between the tailgate extension member and the tailgate via replacement of the above described preferred sliding contact guidance members with elongated ball (or roller) bearing contact guidance members.

Figure 4:
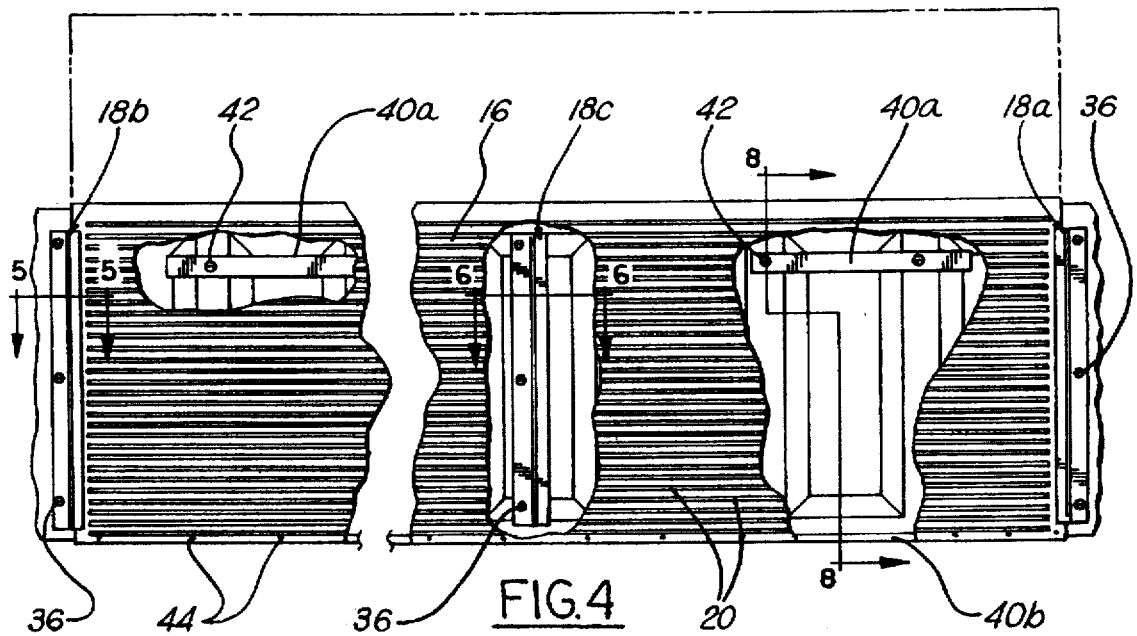
FIG. 4 is a partly cut-away side view of the tailgate extender according to the present invention shown installed on a tailgate of a pick-up truck.

In order to regulate the maximum sliding movement of the tailgate extension member 16 to thereby define the extended position thereof, a stop 40 is provided (see FIGS. 4 and 8). One component of the stop 40 is a first abutment member 40a which is fixedly connected with the bed facing side 12a of the tailgate. Another component of the stop 40 is a second abutment member 40b which is fixedly connected with the interior side 16b of the tailgate extension member 16. The first abutment member 40a and the second abutment member 40b are mutually relatively located, as shown in FIGS. 4 and 8, so that they will mutually interferingly abut when the tailgate extension member 16 is at the maximum extent of slide travel, defined as the extended position wherein the tailgate extension member bottom 16" is located remote from the tailgate bottom 12c, as shown in FIGS. 2 and 3. The first abutment member 40a may be, for example, in the form of a rectangular strip of plastic oriented transversely and affixed to the tailgate 12 by self-tapping screws 42. The second abutment member 40b may be, for example, also in the form of a rectangular strip of plastic oriented transversely and affixed to the tailgate extension member by bolts 44. Alternatively, the second stop member 40b may be connected with, or integrally formed with, the tailgate extension member. It should be noted in this regard, that in the event a "T" shaped alternative elongated boss 38' is used with respect to the two co-acting elongated guides 26 of the alternative central guidance member 18c', the second abutment member 40b would be installed by the bolts 44 after the alternative elongated boss 38' has been guidably received by the elongated guides 25 of the second central guidance member 18c'. Of course, other stop structures can be utilized which provide the slide movement regulation of the tailgate extension member 16 as outlined herein. For example, should connection of the first abutment member 40a be with respect to a guidance member 18, it is still regarded, nonetheless, as being connected fixedly with the tailgate 12.

In operation, if the operator of a pick-up truck equipped with the tailgate extender 10 notices that the load is not well situated with respect to a conventionally configured tailgate 12, the operator pulls on the lip 22 of the tailgate extension member 16 to cause it to slide along the guidance members 18 in relation thereto and to the tailgate. The increased height now afforded the tailgate being suitable to now properly accommodate the load, whether it be a situation in which the tailgate is in the down or the up position.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A tailgate extender for providing selective height adjustment of a tailgate of a bed of a pick-up truck, the tailgate having a bed facing side, a tailgate bottom, a tailgate top opposite the tailgate bottom, a right tailgate side and a left tailgate side opposite the right tailgate side, the right and left tailgate sides each being oriented substantially perpendicular to the tailgate top and tailgate bottom, said tailgate extender comprising:

a tailgate extension member composed of a rigid material, said tailgate extension member having a substantially planar configuration defined by a right tailgate extension member end, a left tailgate extension member end opposite said right tailgate extension member end, a tailgate extension member top and a tailgate extension member bottom opposite said tailgate extension member top;

guidance means for guiding sliding movement of said tailgate extension member, said guidance means comprising guidance member means for slidably interconnecting with said tailgate extension member to thereby guide said tailgate extension member with respect thereto between a retracted position and an extended position;

connection means for connecting said guidance member means to a bed facing side of a tailgate having left and right tailgate sides to thereby guide movement of said tailgate extension member in a direction parallel to the left and right tailgate sides of the tailgate; and stop means for abuttably regulating the movement of said tailgate extension member at a preselected location with respect to said guidance member means to thereby define said extended position;

wherein said tailgate extension member further comprises a lip integrally connected with said gate extension member top, said lip having a predetermined shape for generally conforming to a preselected shape of a tailgate top of the tailgate.

2. The tailgate extender of claim 1, wherein said guidance member means comprises:

a right guidance member for slidably interconnecting with said right tailgate extension member end of said tailgate extension member; and a left guidance member for slidably interconnecting with said left tailgate extension member end of said tailgate extension member.

3. The tailgate extender of claim 2, wherein said tailgate extension member has an interior side; said guidance means further comprising:

an elongated boss connected with said interior side of said tailgate extension member between said right and left tailgate extension member ends, said elongated boss being oriented parallel with respect to said right and left tailgate extension member ends; and a central guidance member for slidably interconnecting with said elongated boss of said tailgate extension member.

4. The tailgate extender of claim 3, wherein each of said first, second and central guidance members comprise:

an upper flange;

a lower flange connected with said upper flange and separated therefrom to thereby define an elongated slot;

wherein said elongated slot receives a selected portion of said tailgate extension member to thereby provide said guided engagement with respect to said tailgate extension member.

5. The tailgate extension member of claim 4, wherein said tailgate extension member is composed of aluminum and said first, second and central guidance members are each composed of nylon.

6. The tailgate extension member of claim 5, wherein said tailgate extension member has an exterior side opposite said interior side thereof; further comprising a plurality of transverse ribs provided on said exterior side.

7. A tailgate for a bed of a pick-up truck, the tailgate being equipped with a tailgate extender for providing selective height adjustment of the tailgate, comprising:

a tailgate having a bed facing side, a tailgate bottom, a tailgate top opposite the tailgate bottom, a right tailgate side and a left tailgate side opposite the right tailgate side, the right and left tailgate sides each being oriented substantially perpendicular to the tailgate top and tailgate bottom; and a tailgate extender comprising:
  a tailgate extension member composed of a rigid material, said tailgate extension member having a substantially planar configuration defined by a right tailgate extension member end, a left tailgate extension member end opposite said right tailgate extension member end, a tailgate extension member top and a tailgate extension member bottom opposite said tailgate extension member top, said tailgate extension member being dimensioned to substantially cover said bed facing side of said tailgate, wherein said tailgate extension member further comprises a lip integrally connected with said tailgate extension member top, said lip having a predetermined shape for generally conforming to a preselected shape of side tailgate top;
  guidance means for guiding sliding movement of said tailgate extension member, said guidance means comprising guidance member means connected with said bed facing side of said tailgate for slidably interconnecting with said tailgate extension member to thereby guide said tailgate extension member with respect thereto between a retracted position wherein said tailgate extension member bottom is substantially near said tailgate bottom and an extended position wherein said tailgate extension member bottom is located remote from said tailgate bottom;
  connection means for connecting said guidance member means to said bed facing side of said tailgate to thereby guide movement of said tailgate extension member in a direction parallel to said left and right tailgate sides; and stop means for abuttably regulating the movement of said tailgate extension member with respect to said guide means to thereby define said extended position.

8. The tailgate equipped with a tailgate extender of claim 7, wherein said guidance member means comprises:

a right guidance member connected with said bed facing side of said tailgate for slidably interconnecting with said right tailgate extension member end of said tailgate extension member; and a left guidance member connected with said bed facing side of said tailgate for slidably interconnecting with said left tailgate extension member end of said tailgate extension member.

9. The tailgate equipped with a tailgate extender of claim 8, wherein said tailgate extension member has an interior side; said guidance means further comprising:

an elongated boss connected with said interior side of said tailgate extension member between said right and left tailgate extension member ends, said elongated boss being oriented parallel with respect to said right and left tailgate extension member ends; and a central guidance member connected with said bed facing side of said tailgate for slidably interconnecting with said elongated boss of said tailgate extension member.

10. The tailgate equipped with a tailgate extender of claim 9, wherein each of said first, second and central guidance members comprise:

an upper flange;

a lower flange connected with said upper flange and separated therefrom to thereby define an elongated slot;

wherein said elongated slot receives a selected portion of said tailgate extension member to thereby provide said guided engagement with respect to said tailgate extension member; and wherein all sliding contact with respect to the movement of said tailgate extension member is at said elongated slot of each said first, second and central guidance members.

11. The tailgate equipped with a tailgate extender of claim 10, wherein said bed facing side of said tailgate is provided with at least one depression; wherein said central guidance member is connected with said tailgate at said at least one depression thereof.

12. The tailgate equipped with a tailgate extender of claim 11, wherein said tailgate extension member is composed of aluminum and said first, second and central guidance members are each composed of nylon.

13. The tailgate equipped with a tailgate extender of claim 12, wherein said tailgate extension member has an exterior side opposite said interior side thereof; further comprising a plurality of transverse ribs provided on said exterior side.

* * * * *